United States Patent
Chang et al.

(10) Patent No.: US 7,921,244 B2
(45) Date of Patent: Apr. 5, 2011

(54) DATA SHARING AND TRANSFER SYSTEMS AND METHODS

(75) Inventors: Ming-Te Chang, LuChou (TW); Chung-Chih Fang, LuChou (TW)

(73) Assignee: Ours Technology, Inc., Jhubei (TW)

( * ) Notice: Subject to any disclaimer, the term of this patent is extended or adjusted under 35 U.S.C. 154(b) by 223 days.

(21) Appl. No.: 12/109,326

(22) Filed: Apr. 24, 2008

(65) Prior Publication Data

US 2009/0013103 A1    Jan. 8, 2009

Related U.S. Application Data

(60) Provisional application No. 60/947,955, filed on Jul. 4, 2007.

(51) Int. Cl.
  G06F 13/12    (2006.01)
  G06F 13/38    (2006.01)
(52) U.S. Cl. .................... 710/62; 709/230
(58) Field of Classification Search ........... 710/36, 710/62, 105
  See application file for complete search history.

(56) References Cited

U.S. PATENT DOCUMENTS

| | | | |
|---|---|---|---|
| 6,408,350 B1 * | 6/2002 | Kawamura et al. | 710/62 |
| 7,082,390 B2 * | 7/2006 | Bergsten | 703/21 |
| 7,412,553 B2 * | 8/2008 | Morrow | 710/305 |
| 2004/0006401 A1 * | 1/2004 | Yamada et al. | 700/83 |
| 2004/0064598 A1 * | 4/2004 | Nakano | 710/11 |
| 2005/0002417 A1 * | 1/2005 | Kelly et al. | 370/466 |
| 2005/0007446 A1 * | 1/2005 | Schrader et al. | 348/14.09 |
| 2006/0095607 A1 * | 5/2006 | Lim et al. | 710/52 |

* cited by examiner

*Primary Examiner* — Henry W Tsai
*Assistant Examiner* — Elias Mamo
(74) *Attorney, Agent, or Firm* — Alston & Bird LLP

(57) ABSTRACT

A communication system may include one or more communication interfaces, a controller, and a storage unit. The communication interface(s) may be configured to be coupled to first and second computing devices. The controller is configured to establish a communication channel between the first and second computing devices. The first and second communication interfaces are coupled with the controller, and the controller is further configured to receive from at least one of the first and second computing devices a communication command communicated in a first format consistent with an external storage device protocol. The storage unit is coupled with the controller and contains a set of instructions recognizable and executable by the first and second computing devices for converting communication requests from at least one of the first and second computing devices to the communication command. The controller is configured to be recognizable by at least one of the first and second computing devices as a storage device controller.

21 Claims, 5 Drawing Sheets

DATA SHARING AND TRANSFER SYSTEMS AND METHODS

CROSS-REFERENCE TO RELATED APPLICATIONS

This application claims priority to U.S. Provisional Patent Application No. 60/947,955, filed on Jul. 4, 2007 and entitled "Apparatus For Data Transmission And Storage."

BACKGROUND OF THE INVENTION

The invention relates to data communication systems, and more particularly to data sharing, storage, and/or transfer systems and methods.

Advancement in digital technology has increased demands for data storage. Crucial data in significant amount are created daily and may need system to back them up. Various data storage and transfer devices have been developed over the years to help users secure, exchange, or transfer their data and many different interfaces may be used for data communication. For example, devices using a Universal Serial Bus (USB) interface have been widely accepted by many computing or processing devices as portable or compact devices to provide data communication, storage, and transfer without demanding separate or resourceful power supply from devices such as a host PC.

Using the USB interface as an example without limiting the scope of the invention, when a user connects a USB device to the host PC, the host PC detects the USB device as a new device. The first thing that the host does after device detection is to issue a command for obtaining device identification or description to the USB device. The new device may respond by sending its device descriptor, which may be a unique description of what the device is. The host PC may then recognize or decide what device driver and communication protocol may be used to communicate with the device. Among various USB devices, multifunction USB devices may support both a linking function where the device connects two hosts for data exchange and a storage function where a host can store data in the device. Those devices may need appropriate device driver(s) and command sets to allow them to function and sometimes may demand a complicated process to set up communication channels and functions.

In some applications, it may be desirable to have data transfer device that may reduce manual or complicated installation of device driver on the host PC.

BRIEF SUMMARY OF THE INVENTION

An example consistent with the invention provides a data communication system. The system includes a first communication interface, a second communication interface, a controller, and a storage unit. The first communication interface is configured to be coupled to a first computing device, and the second communication interface is configured to be coupled to a second computing device. The controller is configured to establish a communication channel between the first and second computing devices. Specifically, the first and second communication interfaces are coupled with the controller, and the controller is further configured to receive from at least one of the first and second computing devices a communication command communicated in a first format and to process the communication command in the first format for executing a communication operation. The storage unit is coupled with the controller and contains instructions recognizable and executable by the first and second computing devices for converting a communication request from at least one of the first and second computing devices to the communication command in the first format recognizable by the controller. The controller is configured to be recognizable by at least one of the first and second computing devices as at least one of a customized controller with customized instructions and as a storage device controller receives at least one of data read and write commands and perform at least one of data read and write operations.

Another example consistent with the invention provides a communication system. The communication system includes one or more communication interfaces, a controller, and a storage unit. The communication interface(s) may be configured to be coupled to first and second computing devices. The controller is configured to establish a communication channel between the first and second computing devices. The communication interface(s) may be coupled with the controller, and the controller is further configured to receive from at least one of the first and second computing devices a communication command communicated in a first format consistent with an external storage device protocol. The storage unit is coupled with the controller and contains a set of instructions recognizable and executable by the first and second computing devices for converting communication requests from at least one of the first and second computing devices to the communication command. The controller is configured to be recognizable by at least one of the first and second computing devices as a storage device controller.

Still another example consistent with the invention provides method for providing a communication channel between computing devices. The method includes providing a system that includes at least one communication interface, a storage unit, and a controller coupled with the at least one communication interface and the storage unit. The method further includes configuring the system: to provide from the storage device the instructions recognizable and executable by at least one of the computing devices for converting a communication request from the computing devices to a communication command in the first format; to receive the communication command from at least one of the computing devices; to process the communication command in the first format for executing communication operations; and to execute a communication operation based on the communication command.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
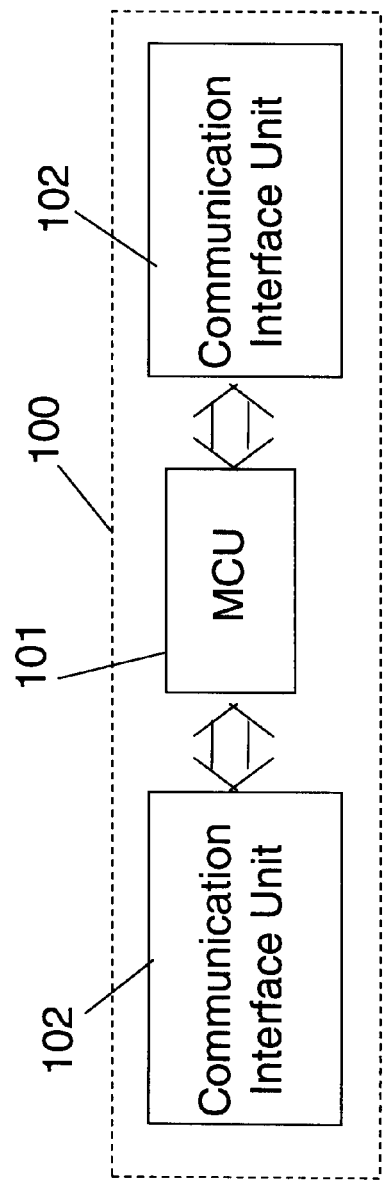
FIG. 1 is a schematic diagram illustrating a control unit layout according to an example consistent with the invention.
Figure 2:
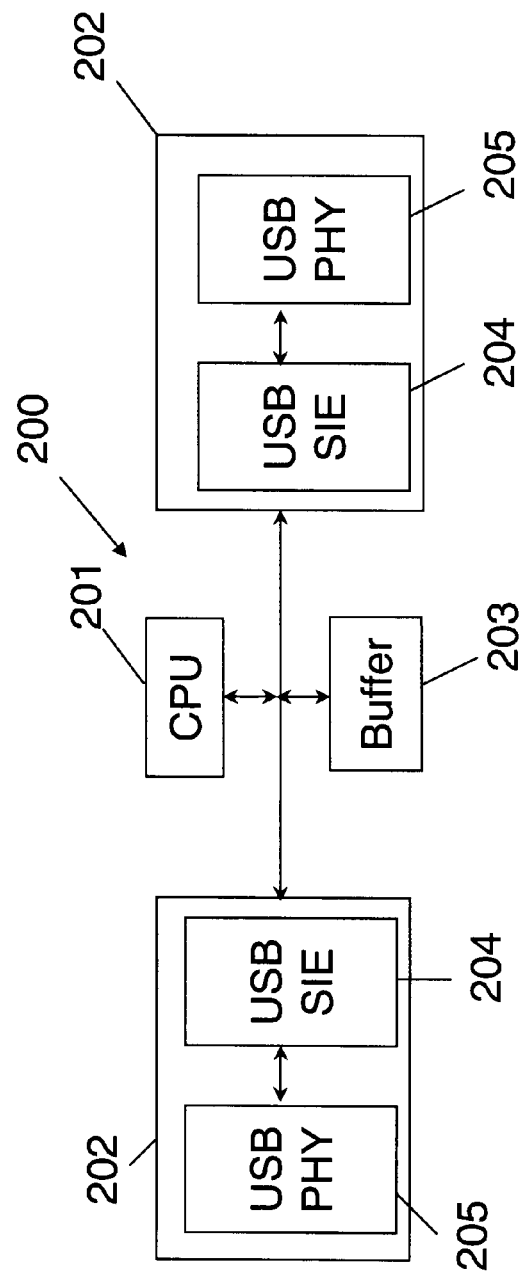
FIG. 2 is a schematic diagram illustrating a data transfer system according to a example of the invention.

Examples consistent with the invention provide systems and methods for allowing two devices or computers to communicate with each other, such as to transfer, exchange, or access data. Various ways may be used for data communication. Examples may include using external storage device, such as storage devices using USB; using data transmission cable coupled between two devices through a peripheral interface such as USB, IEEE 1394 (Firewire), etc. Examples consistent with the invention may provide a communication channel using pre-defined, standard, or customized commands or using standard or existing driver or drivers, such as mass storage driver commonly available within many operation systems. And the two devices may establish data communication by using pre-defined or customized commands or existing data writing and reading commands. Some examples may also provide a communication channel with storage devices, such as flash memory, that interface between two devices for data transfer or other communication applications.

Examples consistent with the invention may allow data communication through standard commands or through specially-defined commands, such as OS—(operation system) based commands or customized commands, which may be defined by vendors or companies providing communication solutions or selling the communication cables or systems. In some examples, when existing or standard commands are used, data communication may be achieved by defining a particular partition area or lot of a memory device. And the command relating the particular partition area or lot may be recognized as a command for one device to write to a second device or as a command for other communication purposes. In other examples, particular folder name(s), address(es), or other identifier(s) used in existing or standard commands may be used for data communication or transfer purposes. In the case of customized commands or OS commands, various commands may be provided for data transfer, network sharing or communication, and the sharing of peripherals, such as screen, printer, etc.

Various illustrative examples will be described using terms commonly employed by those skilled in the art to convey the substance of their work to others skilled in the art. However, it will be apparent to those skilled in the art that the invention may be practiced with only some of the described aspects. For purposes of explanation, specific numbers, materials and configurations are set forth in order to provide a thorough understanding of the illustrative embodiments. However, it will be apparent to one skilled in the art that the invention may be practiced without the specific details. In other instances, well-known features may be omitted or simplified in order not to obscure the illustrative examples.

Further, various operations and/or communications will be described as multiple discrete operations and/or communications, in turn, in a manner that is most helpful in understanding the invention; however, the order of description should not be construed as to imply that these operations and/or communications are necessarily order dependent. In particular, these operations and/or communications need not be performed in the order of presentation.

The invention provides a system which stores data and transmits data between computing devices. The system includes a first communication interface configured to be coupled to a first computing device, a second communication interface configured to be coupled to a second computing device, a controller configured to provide a communication channel between the first and second computing devices and a storage unit coupled to the controller. The first and second communication interfaces are coupled to the controller, and the controller is configured to receive from the first and/or second computing devices a communication command communicated in a first format and to process the communication command in the first format for executing a communication operation. The storage unit is coupled with the controller and contains instructions recognizable and executable by the first and second computing devices for converting a communication request from at least one of the first and second computing devices to the communication command in the first format recognizable by the controller. The controller may be configured to be recognizable by at least one of the first and second computing devices as at least one of a customized controller with customized instructions and as a storage device controller receives at least one of data read and write commands and perform at least one of data read and write operations. The storage unit may contain instructions recognizable by at least one of the first and second computing devices for setting up the communication channel between the first and second computing devices through the controller. In some examples, to achieve a compact-size for the system, the controller may be designed as a controller chip or circuit to integrate with other peripheral devices in the system.

As one example of the invention, the instructions recognizable by at least one of the first and second computing devices may be part of a mass storage class driver. The instructions may also be part of a built-in driver of an operation system of at least one of the first and second computing devices. The storage unit may store the instructions, such as mass storage class driver or similar operation system software for setting up a communication channel between the system and the first and second computing devices. Once the communication channel has been set up, the command and data issued by the computing devices may be sent to the controller, which in turn is configured to be recognized by at least one of the first and second computing devices as a storage device to receive at least one of read, write, or transfer commands and perform at least one of read, write, or transfer operations. Therefore, the controller may be driven by a mass storage class driver available in the operation system of the computing devices to receive at least one of read, write, or transfer commands issued by at least one of the first and second computing devices and perform at least one of read and transfer operations in accordance with the commands. The storage unit may be coupled to the controller such that the data transmitted from the at least one of the first and second computing devices is saved in the storage unit when the controller receives the transfer command from the at least one of the first and second computing devices. And depending on the destination of the transfer command set configured by the computing devices, the data may be stored in the storage unit or transferred to another computing device for storage. As the controller receives the read or write commands from at least one of the first and second computing devices, the controller may be operated to retrieve/send the data from/to the storage unit. In addition, it is possible for the user of a first computer device coupled to the data transfer system to read or access the data stored in a second computing device coupled to the data transfer system or via the controller, when the controller receives read or write command set with destination configured to the second computing device.

In one example, the controller may be a multi-control unit (MCU) that is configured to provide a communication channel between the first and second computing devices. The MCU is coupled to one or more communication interfaces and may be configured to be driven by a mass storage class driver or some other driver that may be recognizable by at least one of the first and second computing devices. The one or more communication interfaces may include more than two communication interfaces for coupling the MCU to two or more computing devices. Therefore, the commands and data may be received from one, some, or all of the computing devices. The MCU may transfer the data from one computing device to another computing device if the command received by the MCU is identified as a transfer command. The MCU may retrieve/send the data from/to the storage unit if the command received by the MCU is identified as a read command. For example, the controller may be configured to receive and accept at least one customized command comprising at least one of storage command sets, transfer command sets, network command sets, protocol command sets, and resource sharing or exchange command sets.

As illustrated in FIG. 1, a MCU 101 may be coupled to two communication interfaces 102 and 102'. The communication interfaces 102 and 102' may include circuitry, driver and/or transceiver for establishing connections to the MCU 101 and the computing devices. And the communication interface unit may be configured to operate with appropriate protocols for established the connection. The MCU 101 may define two or more than two command sets for data flow. Based on the different command sets received from the computing devices, the MCU 101 may determine the destination of the data flow. Examples of the communication interface unit may include, but not limited to USB, USB On-The-Go (OTG), Serial Advanced Technology Attachment (SATA), ATA, Peripheral Control Interface (PCI), Institute of Electrical and Electronic Engineering (IEEE) 1394, etc. The storage unit may include NAND flash memory, NOR flash memory, flash card, Hard Disk Drive (HDD) and any other memory devices with large data storage space. The storage unit may be configured to store the driver software for setting up a data transfer link between the computing devices and the communication system.

In some examples, a Central Processing Unit (CPU) 201 in the data transfer system 200 may be coupled via a transmission line or bus to a buffer 203 and two USB connector interfaces 202 and 202' each having an USB Serial Interface Engine (SIE) 204 or 204' and an USB transceiver/Physical Layer (PHY) 205 or 205'. The CPU 201 and the buffer 203 may be communicated with each other and with the USB SIE 204 or 204' and USB PHY 205 or 205' in a two-way communication manner. For example, when a computing device is connected to the data transfer system via the USB connector interfaces 202, the data received by the USB connector interface 202 may be processed in the CPU 201 or temporarily stored in the buffer 203 when the CPU 201 is busy. The processed data may be stored in the buffer 203 or sent out to another computing device via the USB connector interface 202'. The USB connector interfaces 202 and 202' may have their own specifications such as Universal Host Controller Interface (UHCI), Open Host Controller Interface (OHCI), Enhanced Host Controller Interface (EHCI) and other host controller interfaces developed by computer manufacturers. On a peripheral end of the data transfer system 200, there may be a USB port or connector for connecting to a corresponding USB connector or port in the computing device. The USB port or connector may also be coupled to a suitable length of cable to accommodate connection over a distance. The connector type may include, but not be limited to type A plug, type B plug, mini-A plug, mini-B plug, mini-A receptacle, mini-AB receptacle, and other connectors available for various USB standards (USB 1.0, USB 1.1, USB 2.0 and USB 3.0).

The data transfer system of the invention may be operated to store and transfer data between two computing devices which include but are not limited to personal computers, personal digital assistants (PDA), cell phones, digital cameras, printers, scanners, digital music/video player/recorders such as MP3 and MP4 players, video game consoles, and other available electrical appliances or devices capable of exchanging data with the apparatus of the invention. The computing devices may include a processing unit, a storage unit and a host controller all interconnected via a bus. The computing devices may optionally include a display unit for displaying the information to the user and a network module for sending commands from a remote end via channels, such as Ethernet or wireless communication network.

According to other examples of the invention, the command may also include customized commands directed to various functions, such as storage-to-PC operations, Ethernet sharing, and monitor sharing. In the some examples, the controller may use two or more command sets to determine whether the data received from one computing device is stored in the storage unit of the apparatus or transferred to another computing device for further process or storage. The command or data may be transmitted in packets having identifiers, descriptors, codes or keys for identification in the controller and computing devices. In some examples, the controller may identify the received data or command with the parameters or flags included in the received data or commands.

Figure 3:
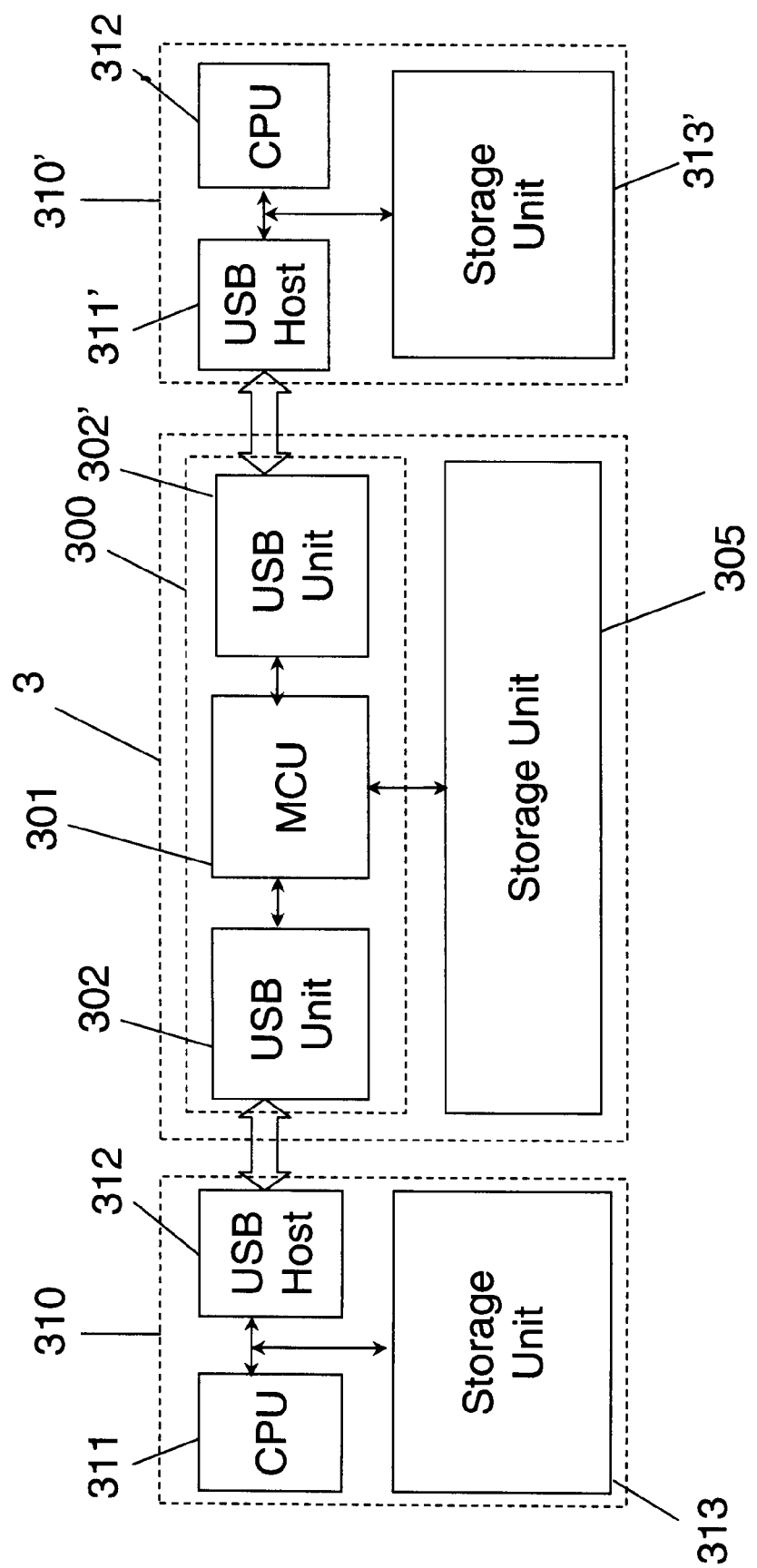
FIG. 3 is a block diagram illustrating a data transfer system according to another example consistent with the invention.

FIG. 3 illustrates a data transfer system 300, which may operate in association with two computing devices 310 and 310'. The system 300 includes a MCU 301 and two USB connector interfaces 302 and 302' coupled to the MCU 301. The system 300 may be a portable data storage and transfer device, a flash disk, or portable HDD. Auto-run software for facilitating data transfer between two computing devices 310 and 310' may be stored in the flash memory 305. After the system 300 is connected via its USB connector interfaces 302 and 302' to the computing devices 310 and 310' respectively, the auto-run software may be automatically downloaded from the flash memory 305 and executed in the computing devices 310 and 310'. Two command sets, such as mass storage and customized command sets, may be defined. If one of the computing devices 310 issues the "write" command of mass storage class, the MCU 301 may direct the data to the flash memory 305. If the computing device 310 issues the command of another customized command set, the MCU 301 may direct the data to another computing device 310'. In other embodiments, other customized command sets, such as network command sets, protocol and resource sharing or exchange command sets, may also be applied to the invention.

Figure 4:
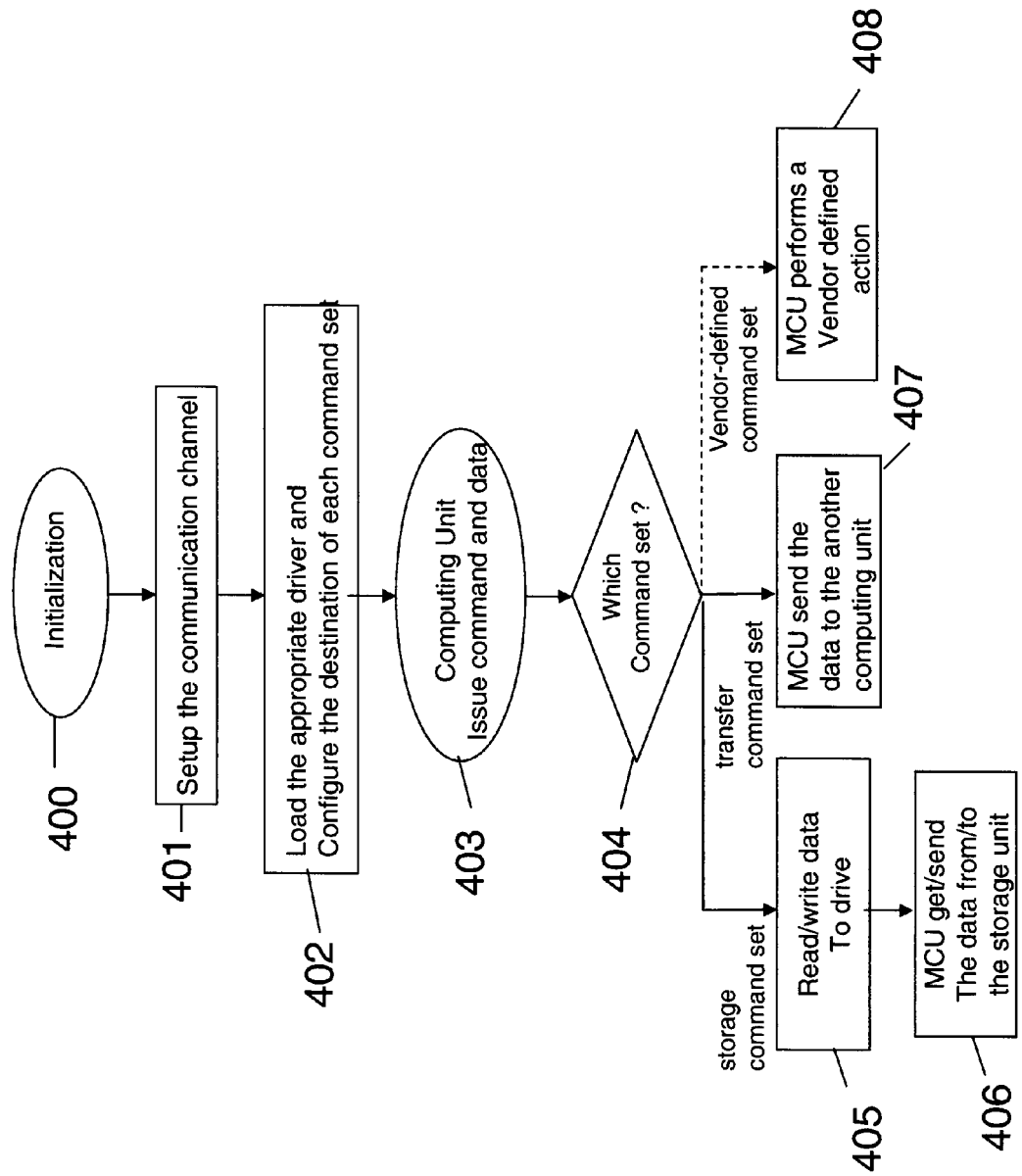
FIG. 4 is a flow chart illustrating an exemplary method for providing a communication channel between computing devices according to another embodiment consistent with the invention.

According to an example of the invention, the operation of the data transfer system 300 may be better understood with reference to the flow chart illustrated in FIG. 4. The process may be initiated by connecting the data transfer system 300 to the two computing devices 310 in step 400. In step 401, the MCU 301 may set up the communication channel between the data transfer system 300 and the two computing devices 310 and 310'. In step 402, the MCU 301 then request the two computing devices 310 and 310' to load appropriate driver stored in the flash memory, and configure the destination of each command set. Because the MCU 301 may support mass storage standard in some examples, the computing devices 310 and 310' may use build-in mass storage class driver in the Operation System (OS), such as Windows NT, 2000, XP, or Vista, Linux OS, Mac OS X and other available OS, to drive the data transfer system 300. The auto-run software for data transfer stored in the flash memory 305 may then be downloaded and executed in the two computing devices 310 and 310'. In step 403, the commands and data issued from one of the computing devices 310 and 310' may be sent via the USB connector interface 302 or 302' to the data transfer system 300. In step 404, the MCU 301 may receive the command and direct the received data to the corresponding destination. For example, the received data may be directed to the processor 311' or storage unit 313' of the other computing device 310'. As the MCU 301 receives a storage command, the MCU 301 either reads/writes data from/to a drive in step 405 or gets/sends the received data from/to the storage unit 305, such as flash memory or HDD in step 406, depending on the destination of the command set configured by the computing devices 310 and 310'. As the MCU 301 receives a transfer command, the MCU 301 then sends the data to another computing device 310' in step 407. As the MCU 301 receives a customized command, the MCU performs a customized action in step 408 in accordance with the customized command. In some embodiments, it is also possible for the data transfer system 300 to operate with more than two command sets and to connect with more than two computing devices. And depending on the command received, the MCU 301 may direct the received data to the corresponding destination.

According to another example, when a computer user wishes to store or transfer data to/from the data transfer system, an USB connector interface on one end of the data transfer system may be plugged into an USB port of the first computer device. As a result, a mass storage class driver recognizable by the first computer device may be sent out via the USB connector interface to establish a data transfer link to the first computer device. And when the computer user wishes to store or transfer data to/from the other computer, he/she may further establish another data transfer link between the data transfer system and the second computer device. Accordingly, a communication channel may be provided between the first and second computer devices via the data transfer system. The controller may prompt the computer user to download the auto-run software from the storage unit and executed in the computer. The commands may be configured by the computer users to define their destinations before issuing to the controller. For example, the command may be defined as a SCSI command for reading/writing the data in a drive, such as the storage unit of the data transfer system or the other computer device. The command may also be defined for transferring the data from one computer or storage unit to another, and vice versa. Therefore, the command may be determined by the controller as a read command, a transfer command or a customized command. The MCU gets/sends the received data from/to the storage unit if the MCU identifies the received command as a read/write command. And if the MCU identifies the received command as a transfer command, the MCU then sends the data to another computer.

According to another example, the data transfer system may be displayed as a virtual disk having storage disk icon in the computing device. And the computing device may be presented as another virtual disk having a Logical Unit Number (LUN) partition, for example about 100 kilobytes (kb). The user may then drag and drop the data packets or files to be stored or transferred from one computing device or storage unit to the disks. However, the invention is not limited to specific manners of presenting the disks and computing devices to the user as long as the data is stored or transferred according to the method or operation of the data transfer system described above.

The invention may also provide a computing device integrated with the data transfer system of the invention. In accordance with one example of the invention, the controller may be a built-in controller of at least one of the first and second computing devices. The controller may be configured to be driven by a mass storage class driver recognizable by at least one of the first and second computing devices. Either the first or second computing device may be connected to another computing device via the at least one communication interface.

Figure 5:
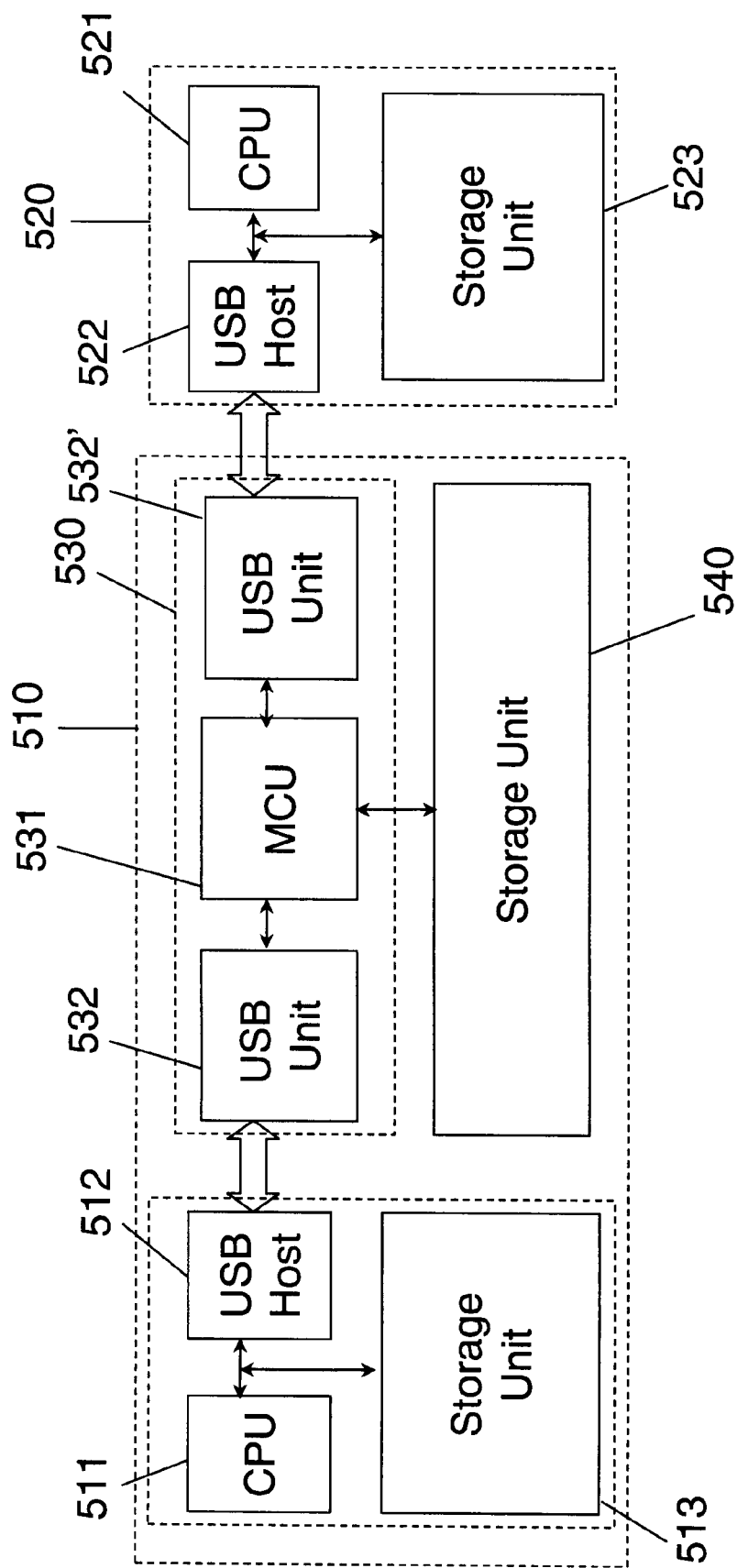
FIG. 5 is a block diagram illustrating a computing device having a built-in data transfer system and connects to another computing device according to an example consistent with the invention.

As one example of the invention, the computing device may optionally include an additional storage unit coupled to the controller. The storage unit may be an NAND flash memory, a NOR flash memory, a flash card, or a hard drive (HDD). The storage unit may also include external memory space such as Secure Digital (SD) memory card, smart media or other forms of memory media accessible by the controller and computing device. Referring to FIG. 5, the controller 530 and the flash memory 540 may be integrated into a computing device 510. Specifically, the MCU 531 may be built on a motherboard of the computing device 510. The computing device 510 may communicate with another computing device 520 through a USB port. As shown in FIG. 5, the computing device 510 includes a CPU 511, a USB host controller 512 and a storage unit 513 all interconnected by a bus. Similarly, the computing device 520 has a CPU 521, a USB host controller 522 and a storage unit 523. The MCU may be coupled to two USB connector interfaces 532, which in turn are coupled to their corresponding USB host controllers 512 and 522 in the computing devices 510 and 520. However, it may also be possible to integrate the controller 530 with other components (not shown) of the computing device 510.

Figure 6:
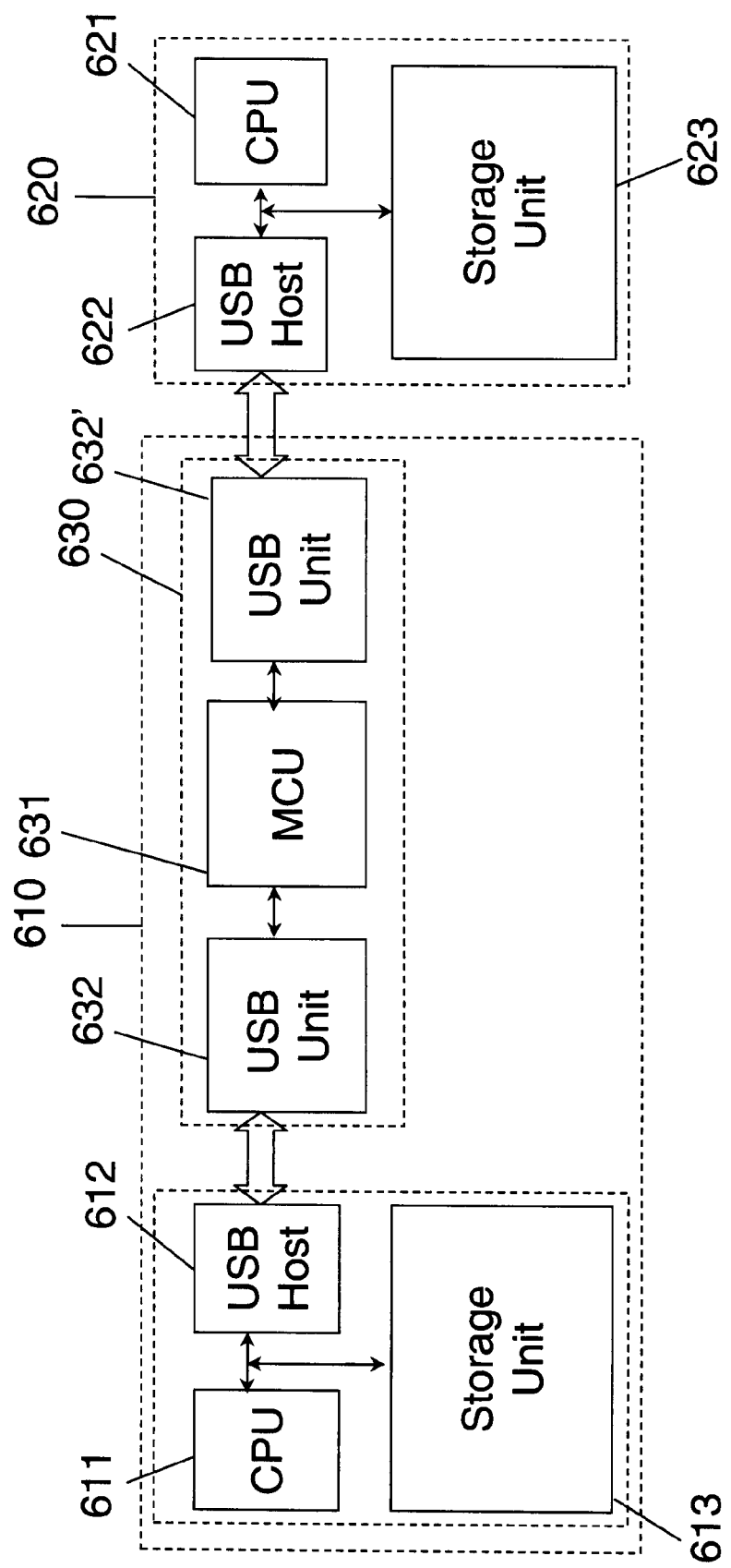
FIG. 6 is a block diagram illustrating a computing device having a built-in data transfer system and connects to another computing device according to an example consistent with the invention.

Referring to FIG. 6, the computing device 610 may communicate with another computing device 620 through a USB port. The computing device 610 includes a CPU 611, a USB host controller 612 and a storage unit 613 all interconnected by a bus. Similarly, the computing device 620 has a CPU 621, a USB host controller 622 and a storage unit 623. The MCU 631 may be coupled to two USB connector interfaces 632, which in turn are coupled to their corresponding USB host controllers 612 and 622 in the computing devices 610 and 620. As shown in FIG. 6, the computing device 610 may be downsized by omitting a storage unit in connection with the controller 630. Since the controller 630 is integrated into the computing device 610, the MCU 631 may use the HDD 613 of the computing device 610 to store data and software. For example, the auto-run software may be downloaded from the storage unit 613 and executed in the computing device 620, specifically by the CPU 621.

It may be advantageous to integrate the control unit and data transfer software into the computing device. The computing device may automatically set up the driver of the MCU and software in booting step. In some embodiments, a control unit having USB OTG interface may be integrated into a computing device. As a result, the computing device may communicate with a USB device or a host through the same USB port.

It is also possible to integrate the USB Host inside the computing device. The computing device integrated with the USB Host may operate in a similar manner to a USB OTG chipset, and may also require the support of the data transfer software and operation system of the computing device.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A data communication system comprising:
    a first computing device coupled to a first communication interface compatible with a first protocol;
    a second computing device coupled to a second communication interface compatible with the first protocol;
    a controller couple to the first and the second communication interfaces; and
    a storage unit coupled to the controller, the storage unit containing instructions for establishing a data communication channel compatible with the first protocol between the first and second computing devices via the controller, and converting a first command in a first format, recognizable and executable by the first and second computing devices, to a second command in a second format, recognizable and executable by the controller, wherein
        the controller is further configured to send the instructions to the first and second computing devices,
        the first and second computing devices are further configured to execute the received instructions to establish the data communication channel compatible with the first protocol between the first and second computing devices via the controller.

2. The system according to claim 1, wherein the instructions are part of a software application recognizable and executable by the first and second computing devices.

3. The system according to claim 1, wherein the controller is a multi-control unit (MCU).

4. The system according to claim 1, wherein the controller is configured to be recognizable by at least one of the first and second computing devices as at least one of a customized controller with customized instructions and as a storage device controller for receiving at least one of data read and write commands and perform at least one of data read and write operations.

5. The system according to claim 1, wherein the second command directs to at least one of a memory partition, a logical unit number, a folder, an address, and an identifier being part of the storage unit.

6. The system according to claim 1, wherein the second command comprises at least one of a read command, a write command, a network communication command, a protocol command, and a resource sharing command.

7. The system according to claim 1, wherein at least one of the first and second communication interfaces comprises an interface compatible with at least one of Universal Serial Bus (USB), USB On-The-Go (OTG), Serial Advanced Technology Attachment (SATA), ATA, Peripheral Control Interface (PCI), and Institute of Electrical and Electronic Engineering (IEEE) 1394 protocols.

8. The system according to claim 1, wherein the controller is a built-in controller of at least one of the first and second computing devices.

9. A communication system comprising:
    a first and second computing devices coupled to at least one communication interface compatible with a first protocol;
    a controller coupled to the at least one communication interface; and
    a storage unit coupled to the controller, the storage unit containing a set of instructions for establishing a communication channel compatible with a first protocol between the first and second computing devices via the controller, and converting a first command in a first format, recognizable and executable by the first and second computing devices, to a second command, recognizable and executable by the controller, wherein
        the controller is further configured to send the instructions to the first and second computing devices, and
        the first and second computing devices are further configured to execute the received instructions to establish the communication channel compatible with the first protocol between the first and second computing devices via the controller.

10. The system according to claim 9, wherein the instructions are part of a software application recognizable and executable by the first and second computing devices.

11. The system according to claim 9, wherein the first protocol is consistent with a mass storage device protocol.

12. The system according to claim 9, wherein the second command comprises a command directing to at least one of a memory partition, a logical unit number, a folder, an address, and an identifier being part of the storage unit.

13. The system according to claim 9, wherein the second command comprises at least one of a read command, a write command, a network communication command, a protocol command, and a resource sharing command.

14. The system according to claim 9, wherein the at least one communication interface comprises an interface compatible with at least one of Universal Serial Bus (USB), USB On-The-Go (OTG), Serial Advanced Technology Attachment (SATA), ATA, Peripheral Control Interface (PCI), and Institute of Electrical and Electronic Engineering (IEEE) 1394 protocols.

15. A method for providing a communication channel between computing devices coupled to at least one communication interface compatible with a first protocol, the method comprising:
    sending, by a controller coupled to the at least one communication interface, instructions stored in a storage unit to the computing devices, the instructions are for establishing the communication channel compatible with the first protocol between the computing devices via the controller, and converting a first command in a first format, recognizable and executable by the computing devices, to a second command, recognizable and executable by the controller,
    receiving and executing, by the computing devices, the instructions to establish the communication channel compatible with the first protocol between the computing devices via the controller.

16. The method according to claim 15, wherein the instructions are part of a software application recognizable and executable by at least one the computing devices.

17. The method according to claim 15, wherein the first protocol comprises one of a customized communication protocol and an existing communication protocol recognizable by at least one of the computing devices.

18. The method according to claim 15, wherein the second command comprises a command directing to at least one of a memory partition, a logical unit number, a folder, an address, and an identifier being part of the storage unit.

19. The method according to claim 15, wherein the second command comprises at least one of a read command, a write command, a network communication command, a protocol command, and a resource sharing command.

20. The method according to claim 15, wherein the first protocol includes at least one of Universal Serial Bus (USB), USB On-The-Go (OTG), Serial Advanced Technology Attachment (SATA), ATA, Peripheral Control Interface (PCI), and Institute of Electrical and Electronic Engineering (IEEE) 1394 protocols.

21. The system according to claim 9, wherein the controller is configured to be recognizable by at least one of the first and second computing devices as a storage device controller.

* * * * *